US010817956B2

(12) United States Patent
Zhang et al.

(10) Patent No.: US 10,817,956 B2
(45) Date of Patent: Oct. 27, 2020

(54) IMAGE-BASED VEHICLE DAMAGE DETERMINING METHOD AND APPARATUS, AND ELECTRONIC DEVICE

(71) Applicant: Alibaba Group Holding Limited, George Town (KY)

(72) Inventors: Haitao Zhang, Hangzhou (CN); Juan Xu, Beijing (CN); Jinlong Hou, Hangzhou (CN); Jian Wang, Beijing (CN); Xin Guo, Hangzhou (CN); Danni Cheng, Hangzhou (CN); Yue Hu, Hangzhou (CN); Bokun Wu, Hangzhou (CN); Yanqing Chen, Hangzhou (CN)

(73) Assignee: Alibaba Group Holding Limited, George Town, Grand Cayman ( * ) Notice: Subject to any disclaimer, the term of this patent is extended or adjusted under 35 U.S.C. 154(b) by 0 days.

(21) Appl. No.: 16/358,527

(22) Filed: Mar. 19, 2019

(65) Prior Publication Data

US 2019/0213689 A1 Jul. 11, 2019

Related U.S. Application Data

(63) Continuation of application No. 15/950,660, filed on Apr. 11, 2018.

(30) Foreign Application Priority Data

Apr. 11, 2017 (CN) .......................... 2017 1 0233657

(51) Int. Cl.
G06Q 40/08 (2012.01)
G06Q 10/10 (2012.01)
(Continued)

(52) U.S. Cl.
CPC ........... *G06Q 40/08* (2013.01); *G06K 9/3233* (2013.01); *G06K 9/4628* (2013.01); (Continued)

(58) Field of Classification Search
CPC ...................................................... G06Q 40/00
(Continued)

(56) References Cited

U.S. PATENT DOCUMENTS 6,246,954 B1 * 6/2001 Berstis ..................... G08G 1/07
340/906
6,826,301 B2 11/2004 Glickman
(Continued)

FOREIGN PATENT DOCUMENTS

CN 1658559 8/2005
CN 102376071 3/2012
(Continued)

OTHER PUBLICATIONS

Database WPI, XP002781821, Week 201644, Thomson Scientific, London GB, AN 2016-38589L, corresponding to CN 105678622, 2017, 1 page.
(Continued)

*Primary Examiner* — Kirsten S Apple
(74) *Attorney, Agent, or Firm* — Fish & Richardson P.C.

(57) ABSTRACT

Methods, systems, and computer-readable storage media for generation of a vehicle repair plan. Implementations include actions of receiving vehicle damage data including an image of a damaged vehicle. The vehicle damage data is processed to determine a damaged area and a damage type of a portion of the damaged vehicle. A repair plan is generated for the damaged vehicle based on the damaged area and the damage type. The repair plan is initiated for the damaged vehicle.

16 Claims, 7 Drawing Sheets

(51) Int. Cl.
  *G06N 3/08* (2006.01)
  *G06T 7/00* (2017.01)
  *G06K 9/62* (2006.01)
  *G06K 9/32* (2006.01)
  *G06K 9/46* (2006.01)
  *G06N 3/04* (2006.01)
  *G06Q 10/00* (2012.01)

(52) U.S. Cl.
  CPC ......... *G06K 9/6256* (2013.01); *G06K 9/6271* (2013.01); *G06N 3/0454* (2013.01); *G06N 3/08* (2013.01); *G06Q 10/10* (2013.01); *G06Q 10/20* (2013.01); *G06T 7/0004* (2013.01); *G06K 2209/23* (2013.01); *G06T 2207/20081* (2013.01); *G06T 2207/20084* (2013.01); *G06T 2207/30108* (2013.01); *G06T 2207/30164* (2013.01); *G06T 2207/30248* (2013.01)

(58) Field of Classification Search
  USPC .......................................................... 705/35
  See application file for complete search history.

(56) References Cited

U.S. PATENT DOCUMENTS

| | | | |
|---|---|---|---|
| 6,969,809 B2 * | 11/2005 | Rainey | B60N 2/002 177/136 |
| 7,889,931 B2 | 2/2011 | Webb et al. | |
| 8,515,152 B2 | 8/2013 | Siri | |
| 8,712,893 B1 * | 4/2014 | Brandmaier | G06F 16/51 705/35 |
| 9,262,789 B1 | 2/2016 | Tofte | |
| 9,307,234 B1 | 4/2016 | Greiner et al. | |
| 9,489,696 B1 | 11/2016 | Tofte | |
| 9,870,609 B2 * | 1/2018 | Kompalli | G06T 7/0002 |
| 9,886,771 B1 | 2/2018 | Chen et al. | |
| 10,580,075 B1 | 3/2020 | Brandmaier et al. | |
| 2002/0007289 A1 * | 1/2002 | Malin | G06Q 10/06 705/4 |
| 2004/0113783 A1 * | 6/2004 | Yagesh | G06Q 10/08 340/568.1 |
| 2004/0183673 A1 * | 9/2004 | Nageli | G01S 5/0018 340/539.13 |
| 2005/0108065 A1 | 5/2005 | Dorfstatter | |
| 2006/0103568 A1 * | 5/2006 | Powell | G01S 13/74 342/42 |
| 2006/0114531 A1 | 6/2006 | Webb et al. | |
| 2006/0124377 A1 * | 6/2006 | Lichtinger | B60N 2/002 180/273 |
| 2006/0267799 A1 * | 11/2006 | Mendelson | G08G 1/14 340/932.2 |
| 2007/0164862 A1 * | 7/2007 | Dhanjal | G06Q 10/08 340/572.1 |
| 2008/0255887 A1 | 10/2008 | Gruter | |
| 2008/0267487 A1 | 10/2008 | Siri | |
| 2008/0281658 A1 | 11/2008 | Siessman | |
| 2009/0033540 A1 * | 2/2009 | Breed | B60N 2/2863 342/29 |
| 2009/0256736 A1 * | 10/2009 | Orr | G01S 7/022 342/20 |
| 2010/0067420 A1 * | 3/2010 | Twitchell, Jr. | G06Q 10/08 370/311 |
| 2010/0073194 A1 * | 3/2010 | Ghazarian | G08G 1/017 340/901 |
| 2010/0100319 A1 * | 4/2010 | Trinko | G01C 21/367 701/455 |
| 2010/0106413 A1 * | 4/2010 | Mudalige | B60W 40/02 701/469 |
| 2010/0265104 A1 * | 10/2010 | Zlojutro | G07C 5/008 340/990 |
| 2010/0265325 A1 * | 10/2010 | Lo | B62D 15/029 348/119 |
| 2010/0271196 A1 * | 10/2010 | Schmitt | G08G 1/052 340/466 |
| 2011/0068954 A1 * | 3/2011 | McQuade | G08G 1/20 340/988 |
| 2011/0102232 A1 * | 5/2011 | Orr | G01S 7/022 342/20 |
| 2012/0029759 A1 * | 2/2012 | Suh | G05B 19/042 701/29.4 |
| 2012/0029764 A1 * | 2/2012 | Payne | G07C 5/0891 701/33.4 |
| 2012/0062395 A1 * | 3/2012 | Sonnabend | G06K 9/00791 340/932.2 |
| 2014/0229207 A1 | 8/2014 | Swamy et al. | |
| 2014/0309805 A1 | 10/2014 | Ricci | |
| 2015/0287130 A1 | 10/2015 | Vercollone et al. | |
| 2016/0239922 A1 | 8/2016 | Jimenez | |
| 2018/0040039 A1 | 2/2018 | Wells et al. | |
| 2018/0182039 A1 | 6/2018 | Wang et al. | |
| 2018/0189949 A1 | 7/2018 | Lapiere et al. | |
| 2018/0260793 A1 | 9/2018 | Li et al. | |
| 2018/0293552 A1 | 10/2018 | Zhang et al. | |
| 2018/0293664 A1 | 10/2018 | Zhang et al. | |
| 2018/0293806 A1 | 10/2018 | Zhang et al. | |
| 2018/0300576 A1 | 10/2018 | Dalyac et al. | |
| 2019/0213563 A1 | 7/2019 | Zhang et al. | |
| 2019/0213804 A1 | 7/2019 | Zhang et al. | |

FOREIGN PATENT DOCUMENTS

| | | |
|---|---|---|
| CN | 103310223 | 9/2013 |
| CN | 104268783 | 1/2015 |
| CN | 104517442 | 4/2015 |
| CN | 105488576 | 4/2016 |
| CN | 105488789 | 4/2016 |
| CN | 105678622 | 6/2016 |
| CN | 105719188 | 6/2016 |
| CN | 105956667 | 9/2016 |
| CN | 106021548 | 10/2016 |
| CN | 106022929 | 10/2016 |
| CN | 106056451 | 10/2016 |
| CN | 106127747 | 11/2016 |
| CN | 106203644 | 12/2016 |
| CN | 106250812 | 12/2016 |
| CN | 106296118 | 1/2017 |
| CN | 106296126 | 1/2017 |
| CN | 106370128 | 2/2017 |
| CN | 106372651 | 2/2017 |
| CN | 106504248 | 3/2017 |
| JP | H0981739 | 3/1997 |
| JP | 2001344163 | 12/2001 |
| JP | 2002183338 | 6/2002 |
| JP | 2003132170 | 5/2003 |
| JP | 2003346021 | 12/2003 |
| JP | 2005107722 | 4/2005 |
| JP | 3839822 | 11/2006 |
| JP | 2015184143 | 10/2015 |
| JP | 2018112999 | 7/2018 |
| JP | 2018537798 | 12/2018 |
| KR | 20160019514 | 2/2016 |
| TW | M478859 | 5/2014 |
| WO | WO 2005109263 | 11/2005 |
| WO | WO 2013093932 | 6/2013 |
| WO | WO 2017055878 | 4/2017 |

OTHER PUBLICATIONS

Database WPI, XP002781822, Week 201714, Thomson Scientific, London GB, AN 2017-10178Y, corresponding to CN 106372651, 2017, 1 page.

International Search Report and Written Opinion in International Application No. PCT/US2018/027192, dated Jun. 20, 2018; 15 pages.

International Search Report and Written Opinion in International Application No. PCT/US2018/027194, dated Jun. 26, 2018; 15 pages.

(56) References Cited

OTHER PUBLICATIONS

International Search Report and Written Opinion of the International Searching Authority issued in International Application No. PCT/US2018/027174 dated Jun. 21, 2018; 10 pages.
Ren et al.; "Faster R-CNN: Towards real-Time Object Detection With Region Proposal Networks"; IEEE Transactions on Pattern Analysis and Machine Intelligence; 2016, pp. 1-14.
Second Written Opinion in International Application No. PCT/US2018/027174, dated Mar. 8, 2019, 7 pages.
Second Written Opinion in International Application No. PCT/US2018/027192, dated Mar. 13, 2019, 7 pages.
Second Written Opinion in International Application No. PCT/US2018/027194, dated Mar. 13, 2019, 7 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Preliminary Report on Patentability Chapter II in International Application No. PCT/US2018/027174, dated Jun. 4, 2019, 25 pages.
International Preliminary Report on Patentability Chapter II in International Application No. PCT/US2018/027192, dated Jun. 4, 2019, 20 pages.
International Preliminary Report on Patentability Chapter II in International Application No. PCT/US2018/027194, dated Jun. 4, 2019, 24 pages.
Ren et al. "Faster R-CNN: Towards real-Time Object Detection With Region Proposal Networks"; IEEE Transactions on Pattern Analysis and Machine Intelligence; 2017, 39(6)1137-1149.
Wang, "Structural Damage Monitoring Based on Vibration Modal Analysis and Neural Network Technique," China Master's Theses Full-Text Database Information Technology, Jan. 2004, 91 pages (with English abstract).
Deng, Accident Prediction, Prevention and Rescue in Intelligent Transport System (ITS), Chinese Master's Theses Full-text Database, Dec. 2014, pp. 1-64 (with English abstract).
Ma et al., "Comparative Study on the Service Models of Auto Insurance Claims in China and Foreign Countries," 3ioneering with Science and Technology Monthly, Nov. 2012, 11:47-48 (with English abstract).
Yongming et al., "Research on honeycomb sandwich composite structure damage detection based on matching pursuit method," Chinese Journal of Scientific Instrument, 2012, 33(4):836-842 (with English abstract).

\* cited by examiner

IMAGE-BASED VEHICLE DAMAGE DETERMINING METHOD AND APPARATUS, AND ELECTRONIC DEVICE

CROSS REFERENCE TO RELATED APPLICATIONS

This application is a continuation and claims priority to U.S. application Ser. No. 15/950,660, filed on Apr. 11, 2018, which claims priority to Chinese Patent Application No. 201710233657.6, filed on Apr. 11, 2017, which are hereby incorporated by reference in their entireties.

TECHNICAL FIELD

The present application relates to the field of computer image data processing technologies, and in particular, to an image-based vehicle damage determining method, apparatus, and an electronic device.

BACKGROUND

After a traffic accident occurs, there is usually a need to wait for an adjuster of an insurance company to perform processing on site, and collect evidence for a claim by means, such as photographing. As the number of vehicles increase in recent years, so does the number of traffic accidents. Claim and damage determination service of a vehicle usually needs to be processed by a professional insurance staff on site, which can result in high cost, long waiting period, and low efficiency.

Currently, in some processing methods in the industry, automatic analysis is performed by using an image of a traffic accident site to obtain a predetermined damaged area category of the vehicle. For example, according to the disclosure entitled "Method and System for Analyzing Vehicle Insurance Claim Picture" with the application publication number "CN105678622A", an algorithm is disclosed to use a conventional convolutional neural network (CNN) to analyze a claim picture uploaded by a mobile terminal, identify a damaged area category, and generate alert information based on an analysis result. However, in the method, simply a damaged area category such as a front, a side, or a trail of the vehicle is determined, but no specific damage type is identified. The alert information of the identified damaged area is mainly used by the insurance company staff to compare with damage determined by human, and serves as reference information to help the insurance company staff with damage determination and calculation. In addition, the algorithm uses only an object identification algorithm commonly used in the CNN. A final determination of vehicle damage is still made by a human being. Consequently, labor and time costs are relatively high. In addition, due to the differences of vehicle damage approval standards by different insurance companies and subjectivity, a vehicle damage determination result can vary greatly, and reliability can be relatively low.

SUMMARY

The present application aims to provide an image-based vehicle damage determination method, apparatus, and an electronic device, so as to quickly, accurately and reliably detect specific information such as a damaged area and a degree of damage of an auto part, to provide a more accurate and reliable damage determination result, maintenance plan information for a user, and quickly and efficiently processing vehicle damage determination, thereby greatly improving user service experience.

An image-based vehicle damage determining method and apparatus, and an electronic device provided in the present application are implemented as follows:

An image-based vehicle damage determining is provided, where the method includes: obtaining an auto part image corresponding to an auto part; checking the auto part image by using a constructed component damage identification model, to determine a damaged area and a damage type of the auto part; and generating a repair plan for the auto part based on information including the damaged area and the damage type of the auto part.

An image-based vehicle damage determination apparatus is provided, where the apparatus includes: an image acquisition module, configured to obtain an auto part image corresponding to an auto part; a check module, configured to: store a constructed component damage identification model, and check the auto part image by using the component damage identification model, to determine a damaged area and a damage type of the auto part; and a damage determination processing module, configured to generate a repair plan for the auto part based on information, including the damaged area and the damage type of the auto part.

An image-based vehicle damage determination apparatus is provided, and includes a processor and a memory configured to store an instruction that can be executed by the processor, wherein when executing the instruction, the processor implements the following operations: obtaining an auto part image corresponding to an auto part; checking the auto part image by using a constructed component damage identification model, to determine a damaged area and a damage type of the auto part; and generating a repair plan for the auto part based on information, including the damaged area and the damage type of the auto part.

A computer readable storage medium is provided, where the computer readable storage medium stores a computer instruction, and when the instruction is executed, the following steps are implemented: obtaining an auto part image corresponding to an auto part; checking the auto part image by using a constructed component damage identification model, to determine a damaged area and a damage type of the auto part; and generating a repair plan for the auto part based on information including the damaged area and the damage type of the auto part.

An electronic device is provided, and includes a processor and a memory configured to store an instruction that can be executed by the processor, where when executing the instruction, the processor implements the following operations: obtaining an auto part image corresponding to an auto part; checking the auto part image by using a constructed component damage identification model, to determine a damaged area and a damage type of the auto part; and generating a repair plan for the auto part based on information including the damaged area and the damage type of the auto part.

According to the image-based vehicle damage determination method and apparatus, and the electronic device provided in the present application, a training model identifying information such as a damaged area and a damage type more comprehensively and reliably can be constructed, and a damaged area and a damage type corresponding to the damaged area of an auto part can be detected by using the model, so as to obtain information required for accurate and comprehensive damage determination of the auto part. Further, in the implementations of the present application, a repair plan for the auto part is generated by using information including the identified damaged area and the damage type, so as to provide more accurate and reliable damage determination information with a practical reference value for an insurance staff and a vehicle owner. In the implementations of the present application, a repair plan can be automatically generated based on specific vehicle damage information, an auto part price library, and a maintenance processing method, so as to satisfy a requirement of an insurance company or a vehicle owner for quick, comprehensive, accurate, and reliable vehicle damage determination processing, improve accuracy and reliability of a vehicle damage determination processing results, and improve user service experience.

BRIEF DESCRIPTION OF DRAWINGS

To describe the technical solutions in the implementations of the present application or in the existing technologies more clearly, the following briefly describes the accompanying drawings for describing the implementations or the existing technologies. Apparently, the accompanying drawings in the following description merely show some implementations of the present application, and a person of ordinary skill in the art can still derive other drawings based on these drawings without creative efforts.

DESCRIPTION OF EMBODIMENTS

To help a person with ordinary skill in the art better understand the technical solutions in the present application, the following clearly and completely describes the technical solutions in the implementations of the present application with reference to the accompanying drawings of the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
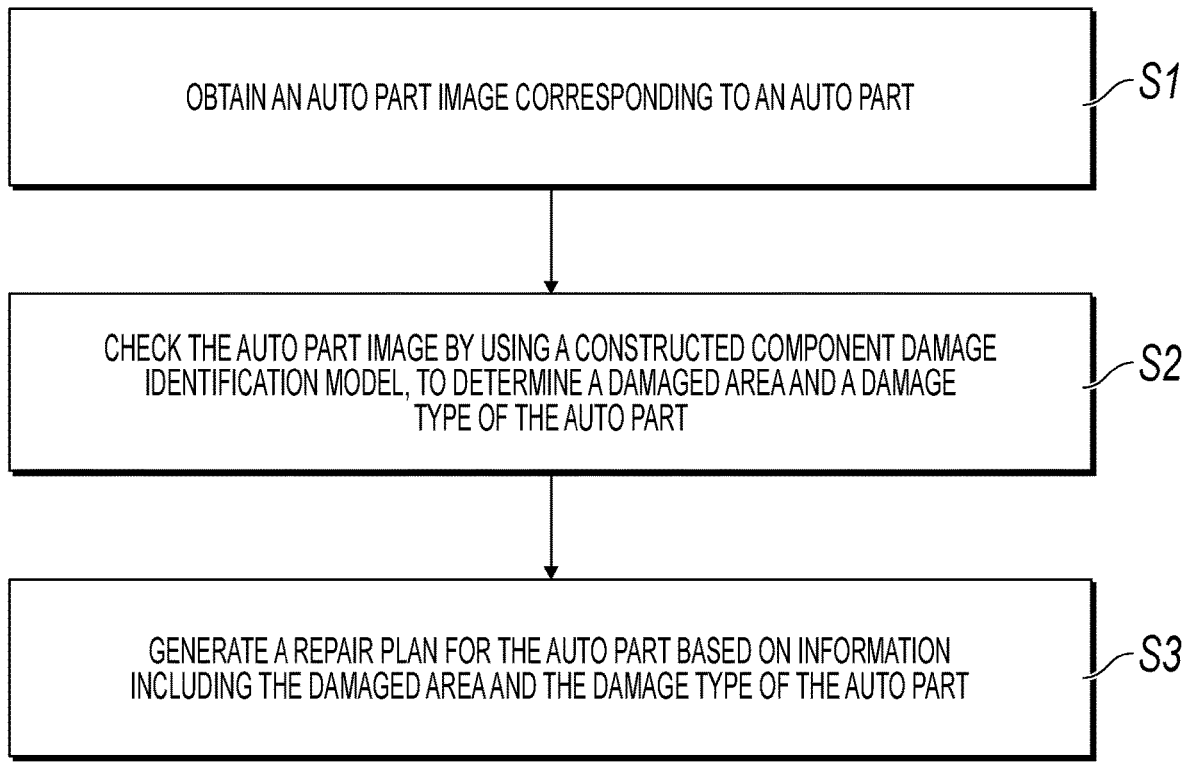
FIG. 1 is a flowchart of an image-based vehicle damage determination method, according to an implementation of the present application.

FIG. 1 is a flowchart of an image-based vehicle damage determination method according to an implementation of the present application. Although the present application provides a method operation step or an apparatus structure shown in the following implementations or the accompanying drawings, the method or apparatus can include more or, after combination, fewer operation steps or module units based on a conventional or non-creative effort. In steps or a structure without a necessary causal relationship in logic, an execution sequence of these steps or a module structure of the apparatus is not limited to the execution sequence or the module structure shown in the implementations of the present application or the accompanying drawings. In actual apparatus, servers, or terminal product applications (APPs), the method or the module structure can be performed sequentially or in parallel based on the method or the module structure shown in the implementations or the accompanying drawings (for example, a parallel processor or a multi-threaded processing environment, or even a distributed processing implementation environment and a server cluster implementation environment).

In existing actual traffic accident such as a scratch accident, there is usually a need to wait for an adjustor of an insurance company to take a picture on the scene before a party can leave the scene. Therefore, traffic jams may often be caused, a large amount of time may be wasted, and the time for obtaining information about a damage determination result can be relatively long. In the implementations of the present application, when a traffic accident happens, a party vehicle owner involved usually wants to know a damage or a claim status of their vehicle or the other vehicle involved. In such case, the vehicle owner can take a picture of the traffic accident scene as evidence. In addition, automatic evaluation of vehicle damage and a claim status, etc. can be performed by using an APP and based on the pictures taken, in order to satisfy the need of the party vehicle owner for quick, comprehensive, accurate, and reliable vehicle damage determination processing.

For clarity, the following implementations are described by using a specific application scenario that a party vehicle owner requests a vehicle damage determination service by using a mobile APP. In the application scenario of the implementations, the vehicle owner can take a picture of the damaged location of the vehicle by using a mobile device (such as a mobile phone) on a traffic accident scene, and then upload the picture (or image) by using the APP. When uploading the picture, the vehicle owner can select or input information about an auto part such as a front bumper, a left front door, or a taillight of the vehicle. After obtaining the picture of the single auto part that is uploaded by the vehicle owner, a cloud server can identify a damaged area location and a damage type of the auto part in the picture based on a machine learning algorithm. The cloud server can then develop a rule engine, invoke different pricing scheme databases based on repair strategy information such as vehicle model, location, and repair shop, and generate at least one repair plan for the auto part. The repair plan can be returned to the vehicle owner, and the vehicle owner can quickly obtain a vehicle damage determination result. Certainly, if the user is an insurance company employee, the repair plan can be returned directly to the insurance company, or a repair plan can be directly displayed. However, a person skilled in the art can understand that the spirit of the present solution can be applied to other implementation scenarios of vehicle damage determination, for example, automatic vehicle damage determination of an insurance company or a repair shop, or self-service vehicle damage determination services provided by 4S stores or other service providers.

Specifically, an implementation is shown in FIG. 1. In an implementation of an image-based vehicle damage determination method according to the present application, the method can include the following steps.

S1. Obtain an auto part image corresponding to an auto part. A server can obtain an auto part image of a single auto part from a client or a third-party server (such as a server of an insurance company). In this implementation, the previous auto part images can be considered as an image of the auto part. The auto part image in this implementation can be a general name of various graphics and images, generally refers to a picture having a visual effect, and can usually include a picture on a medium such as a paper, a negative, a photo, a television, a projector, or a computer screen. In the application scenario of this implementation, when uploading the auto part image, the vehicle owner can specify component information of the auto part image, for example, an auto part image of a front bumper, a left front door, or a taillight. Certainly, the client or the server side can tag information of a corresponding auto part for the obtained auto part image. The auto part is usually a component on a vehicle, for example, a front bumper, a left front door, or a taillight.

In an optional implementation, it can be further determined whether image quality of the auto part image reaches a predetermined processing requirement. If the image quality is relatively poor, for example, the picture is obscure and cannot be identified, the auto part image can be discarded, and feedback can be returned to the mobile APP to prompt the user to consider factors such as focusing and illumination that affect definition when the user takes a picture.

S2. Determine a damaged area and a damage type of the auto part by parsing the auto part image using a pre-constructed auto part damage identification model. After obtaining the auto part image, the cloud server side can parse the auto part image by using the pre-constructed auto part damage identification model, to identify the damaged area and the damage type of the auto part in the image. The damaged area in this implementation is usually a part that is damaged on the vehicle. A damaged auto part may include a plurality of damaged areas, and each damaged area corresponds to a damage type (for example, severe scratching or mild deformation). In this implementation, a location region of a damaged area in an image to be processed can be parsed to identify a damage type. The damage type in this implementation can include types such as mild scratching, severe scratching, mild deformation, moderate deformation, severe deformation, damage, and disassembling-required check, etc.

In this implementation, a designed machine-learning algorithm can be used in advance to construct a component damage identification model used to identify the damaged area and the damage type of the auto part in the image. After sample training, the component damage identification model can identify the damaged area and the damage type of the auto part in the auto part image. In this implementation, the component damage identification model can use network models or transformed network models of a deep neural network, and is constructed after sample image training. In another implementation of the method provided in the present application, the component damage identification model can be constructed based on a convolutional neural network (CNN) and a region proposal network (RPN) with reference to a pooling layer, a fully connected layer, etc. Therefore, in another implementation of the method of the present application, the component damage identification model includes: S201. A deep neural network constructed after sample data training and based on network models of a convolutional layer and a region proposal layer. The convolutional neural network is usually a neural network mainly including a convolutional layer (CNN) with reference to other layers such as an activation layer, and is mainly used for image identification. The deep neural network in this implementation can include a convolutional layer and other important layers (such as a pooling layer, a data normalization layer, and an activation layer), and is constructed with reference to a region proposal network (RPN). The convolution neural network usually combines a two-dimensional discrete convolution operation with an artificial neural network in image processing. The convolution operation can be used to automatically extract a feature. The region proposal network (RPN) can use a feature extracted from an image (of any size) as an input (a two-dimensional feature extracted by the convolutional neural network can be used), and output a set of rectangular target proposal boxes. Each box has an object score. To avoid confusion, in this implementation, the convolutional neural network (CNN) used can be referred to as a convolutional layer (CNN), and a region proposal network (RPN) can be referred to as a region proposal layer (RPN). In another implementation of the present application, the component damage identification model can further include the deep CNN constructed after sample data training and based on a transformed network model obtained after the CNN network or the RPN has been improved.

The model and algorithm used in the previous implementation can select the same model or algorithm. Specifically, for example, in a component identification model, a plurality of models and transformations based on the convolutional neural network and the region proposal network can be used, for example, Faster R-CNN, YOLO, and Mask-FCN. The convolutional neural network (CNN) can use any CNN model, for example, ResNet, Inception, VGG, and their transformations. Generally, a convolutional network (CNN) part in a neural network can use a developed network structure having a relatively good capability in object identification, for example, an Inception or ResNet network. Using a ResNet network as an example, if the input is a picture, the output can be a plurality of picture regions with damaged areas, corresponding damage categories (the damage categories are used to determine damage types), and confidence (confidence is a parameter indicating a degree of authenticity of the damage type). Faster R-CNN, YOLO, Mask-FCN, etc. are deep neural networks that include the convolutional layer and can be used in this implementation. The deep neural network used in this implementation can detect a damaged area, a damage type, and a location region of the damaged area in the auto part image with reference to the region proposal layer and the CNN layer.

It should be noted that, in an implementation of the present application, the auto part image can be parsed by using an individual algorithm server to identify the damaged area and the damage type of the auto part in the auto part image. For example, a service server is configured to obtain the auto part image of the auto part and output a repair plan. An algorithm server can also be configured to store the constructed component damage identification model, parse and identify the auto part image on the service server, and determine the damaged area and the damage type of the auto part. Certainly, the previous processing can also be done by the same server.

S3. Generate a repair plan for the auto part based on information including the damaged area and the damage type of the auto part. After determining the damaged area and the damage type of the auto part, the algorithm server can generate the repair plan for the auto part based on the previous information and a predetermined processing rule.

For example, a left front panel of a B1-model vehicle of a manufacturer A1 in 2016 is mildly deformed and requires metal beating processing; a left front door of a B2-model vehicle of a manufacturer A2 in 2010 is severely scratched and severely deformed and requires replacement processing; a front bumper of a B3-model vehicle of a manufacturer A3 in 2013 is mildly scratched and requires spray painting, and a left headlight needs to be disassembled for inspection, etc.

In another implementation of the method in the present application, to satisfy user's need for a price quotation in a vehicle damage determination, the repair plan can further include information about an estimated price for auto part repair, so that the user can learn repair price information, select a more suitable repair option, satisfy user requirement, and improve user experience. Therefore, in another implementation of the method in the present application, the method can further include the following step: S300. Obtain information about a repair strategy of the auto part. Correspondingly, the repair plan can further include an estimated repair price corresponding to the repair strategy, and the estimated repair price is an estimated repair price of the auto part that is calculated based on the information including the damaged area, the damage type, and the repair strategy of the auto part, price of auto parts included in the repair strategy and the cost of the repair service.

Figure 2:
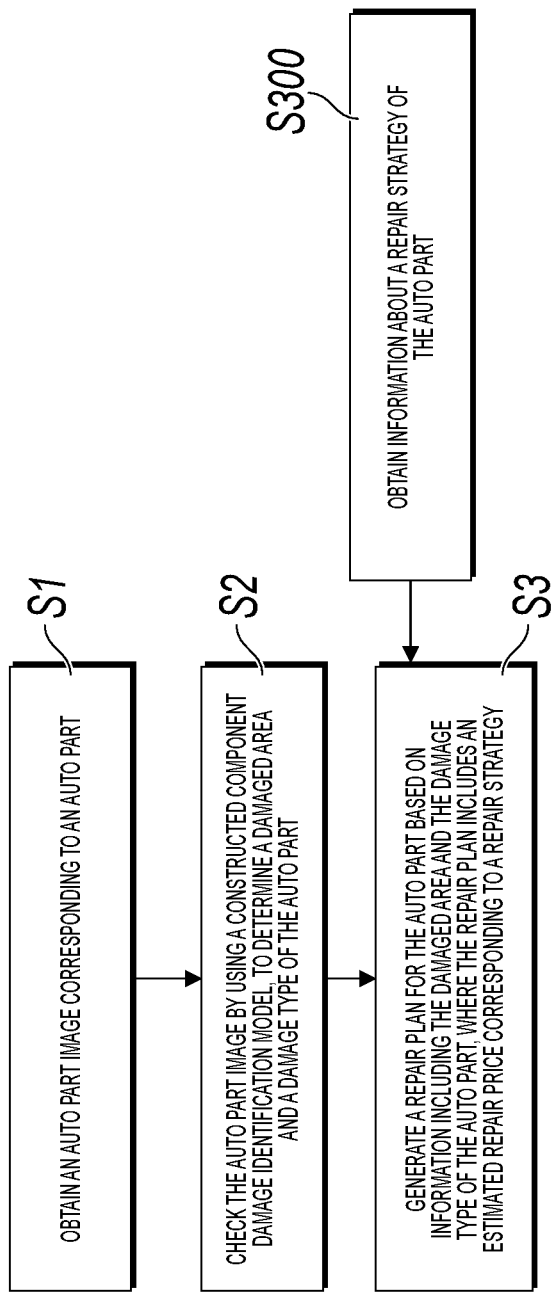
FIG. 2 is a schematic flowchart of an image-based vehicle damage determination method according to another implementation of the present application.

FIG. 2 is a schematic flowchart of another implementation of the method in the present application. In a specific implementation, a calculation rule can be designed, to invoke different price libraries based on the information about the repair strategy such as a model of the auto part, a selected repair location of the auto part, a repair shop (4S store or a common integrated repair shop), and generate the repair plan for the auto part that includes a preliminary repair processing method and a corresponding estimated repair price. The information about the repair strategy can be selected by the user. For example, the user can select a repair location (for example, based on a city-level or district-level division), select a 4S store or an integrated repair shop, and input a vehicle brand and model. Afterwards, the algorithm server can obtain the following repair plan based on information about the repair strategy of the auto part and the identified damaged area and damage type:

A front bumper of a B3-model vehicle of the manufacturer A3 in 2013 is mildly scratched and requires spray painting, and estimated repair cost at a local 4S store is 600 yuan RMB.

Certainly, in another implementation, information such as a damaged auto part, a damage type, and a degree of damage of the vehicle on an accident scene can also be obtained based on claim experience of a conventional vehicle insurance company, and an engine module is created with reference to information such as repair hours and costs at the 4S store. When an APP used for actual processing identifies the damaged area and the damage type of the auto part, the engine module can be invoked to output a damage determination result for the auto part.

The information about the repair strategy can be modified or replaced. For example, if the user can select the 4S store for repair, there is a corresponding repair strategy and a corresponding repair plan. If the user selects the integrated repair shop for repair, there is another corresponding repair strategy, and another repair plan is generated accordingly.

It should be understood that damage determination can usually include two pieces of information: damage evaluation and price evaluation. In this implementation of the present application, if the output repair plan for the auto part does not include information about repair costs, damage determination can be the damage evaluation. If the output repair plan for the auto part includes information about repair costs, both the damage evaluation and the price evaluation are performed. The two repair plans included in vehicle damage determination processing.

According to the image-based vehicle damage determination method provided in this implementation of the present application, a training model more comprehensively and reliably identifying information such as a damaged area and a damage type can be constructed, and a damaged area and a damage type corresponding to the damaged area of an auto part can be detected by using the model, so as to obtain information needed for accurate and comprehensive damage determination of the auto part. Further, in this implementation of the present application, a repair plan for the auto part is generated by using information including the identified damaged area and the damage type, so as to provide more accurate and reliable damage determination information with a practical reference value for an insurance staff and a vehicle owner. In another implementation of the present application, a repair plan and estimated repair costs can be automatically generated based on more specific vehicle damage information, an auto part price library, and a repair processing method, so as to satisfy a requirement of an insurance company or a vehicle owner for quick, comprehensive, accurate, and reliable vehicle damage determination processing, improve accuracy and reliability of a vehicle damage determination processing result, and improve user service experience.

In another implementation scenario, the obtained auto part image can include a plurality of damaged areas. In another implementation of the method in the present application, the deep neural network model can be set to identify each damaged area and a damage degree (a damage type) of each damaged area. Specifically, in an implementation, when the currently processed auto part image includes at least two damaged areas, the component damage identification model is configured to: S200. Identify, based on the auto part image, the damaged areas of the auto part and one or more damage types corresponding to the damaged areas. S210. Select a damaged area corresponding to a damage type of the one or more damage types that has a highest damage degree as the damaged area of the auto part. Correspondingly, the damage type with the highest damage degree is the determined damage type of the auto part.

Each damage type usually corresponds to a respective repair plan. For example, severe deformation corresponds to replacement, mild deformation requires metal beating, and mild scratching requires spray painting. For the user, one repair plan can be eventually output for one component. When a plurality of parts is damaged, a repair method for a part that is damaged the worst is used as a final processing method for the entire component. Generally, an auto part of the vehicle can be considered as a whole. When more than one area on the auto part is damaged, it is appropriate to process the most severe damage. In this implementation, one repair plan may be selected to repair all the damages. For example, a damage type of a damaged area is severe damage, and replacement is required; a damage type of another damaged area is moderate deformation and requires metal beating. In this case, replacement can be performed without the need of metal beating.

In the previous implementation, a plurality of damaged areas in a single auto part image can be identified during model training. During specific sample training, if a picture is used as input, a plurality of picture regions and corresponding damage categories are output. The selected neural network parameter can be obtained after mini-batch gradient descent training performed by using marked data. For example, when mini-batch=32, 32 training pictures are used as inputs. The marked data marks a region and an image of a corresponding type, and can be obtained by manually marking a real vehicle damage picture. An input of the neural network is a picture, and the output region is related to the number of damaged areas in the picture. Specifically, for example, if there is one damaged area, one picture region can be the output; if there are K damaged areas, K picture regions can be the output; and if there is no damaged area, no picture region is output.

Figure 3:
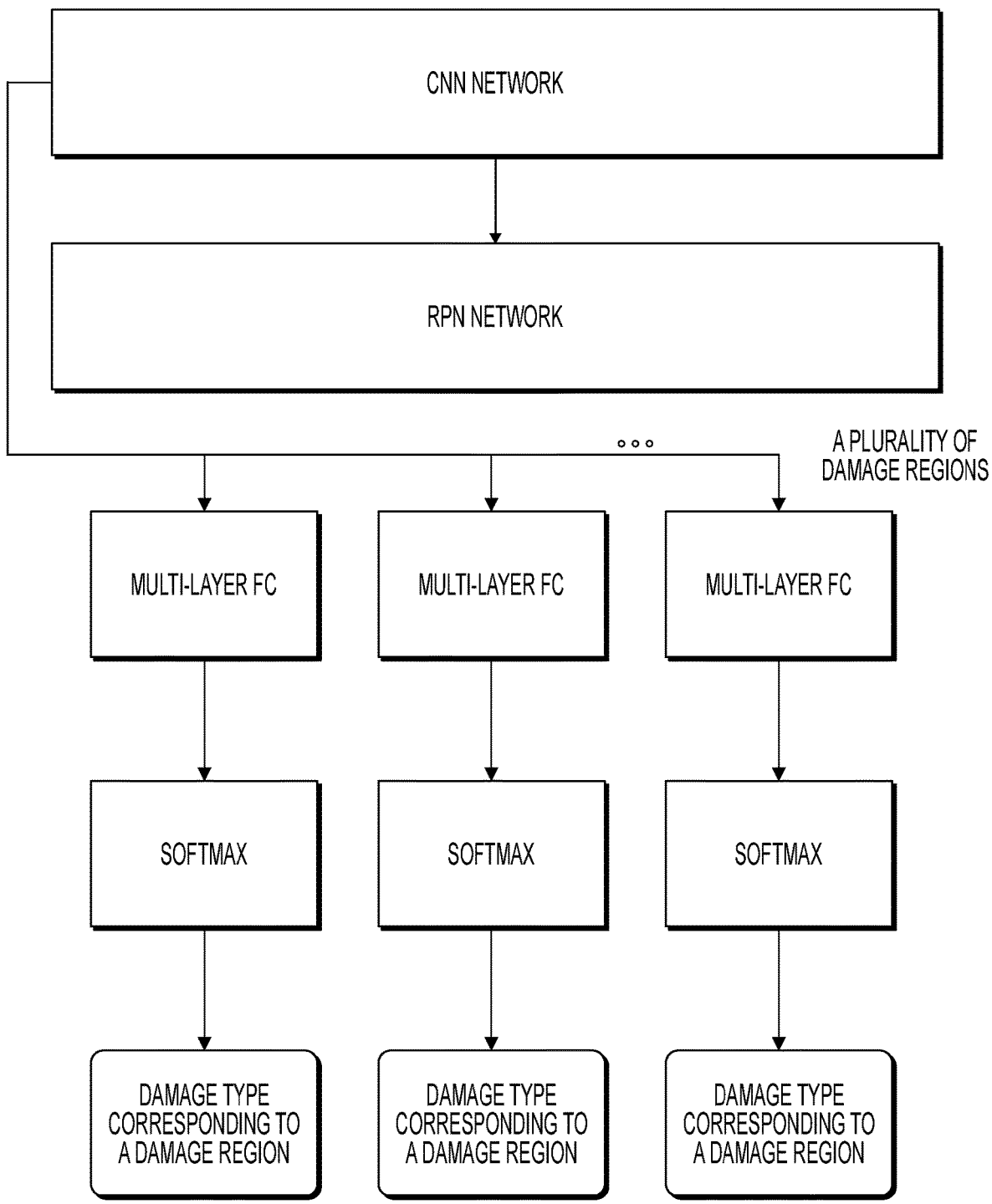
FIG. 3 is a schematic diagram of a network structure of a neural network for identifying an auto part image according to an implementation of the present application.

In damage determination processing, the auto part image is input to the neural network. If there is a plurality of damaged areas, a plurality of picture regions including the damaged areas is detected, the picture regions are parsed, damage types of the picture regions are determined, and damaged areas and damage types corresponding to the picture regions are separately output. Further, in this implementation, a damaged area corresponding to a damage type that is in the damage types and that indicates a highest damage degree can be selected as the damaged area of the auto part. Correspondingly, the damage type with the highest damage degree is the determined damage type of the auto part. FIG. 3 is a schematic diagram of a network structure of a neural network for checking an auto part image according to an implementation of the present application.

In another implementation scenario, if a plurality of pictures of a single component is obtained, damaged areas and damage categories can be separately detected from the pictures, so as to combine parsing results of the plurality of pictures to obtain a more reliable result. Therefore, in another implementation of the method in the present application, if at least two auto part images of the auto part are obtained, the parsing of the auto part image using a constructed component damage identification model to determine a damaged area and a damage type of the auto part includes the following steps:

S20. Separately check the auto part images by using the component damage identification model, to determine a damaged area and a damage type of each auto part image.

S21. Parsing, based on a predetermined rule, the damaged areas and the damage types corresponding to each auto part image, to determine the damaged area and the damage type of the auto part.

The parsing step of the method can be customized. For example, to determine the damaged area and the damage type of each auto part image, a damage type with the highest damage degree can be selected as an output damage type and a corresponding damaged area of the auto part. For example, assume that two pictures of a rear bumper are obtained, one taken from the side and the other taken from the front. A parsing result of identifying the picture taken from the front is that the rear bumper is mildly deformed on the right. However, a parsing result obtained by identifying the picture taken from the side is that the rear bumper is damaged with a damage type more severe than mild deformation. The picture shot from the front is not comprehensive, and the picture shot from the side shows a more real damage status of the rear bumper. Therefore, the parsing results of the two pictures can be combined by using the solution provided in this implementation, that the rear bumper is damaged, so that the output result is more reliable.

Figure 4:
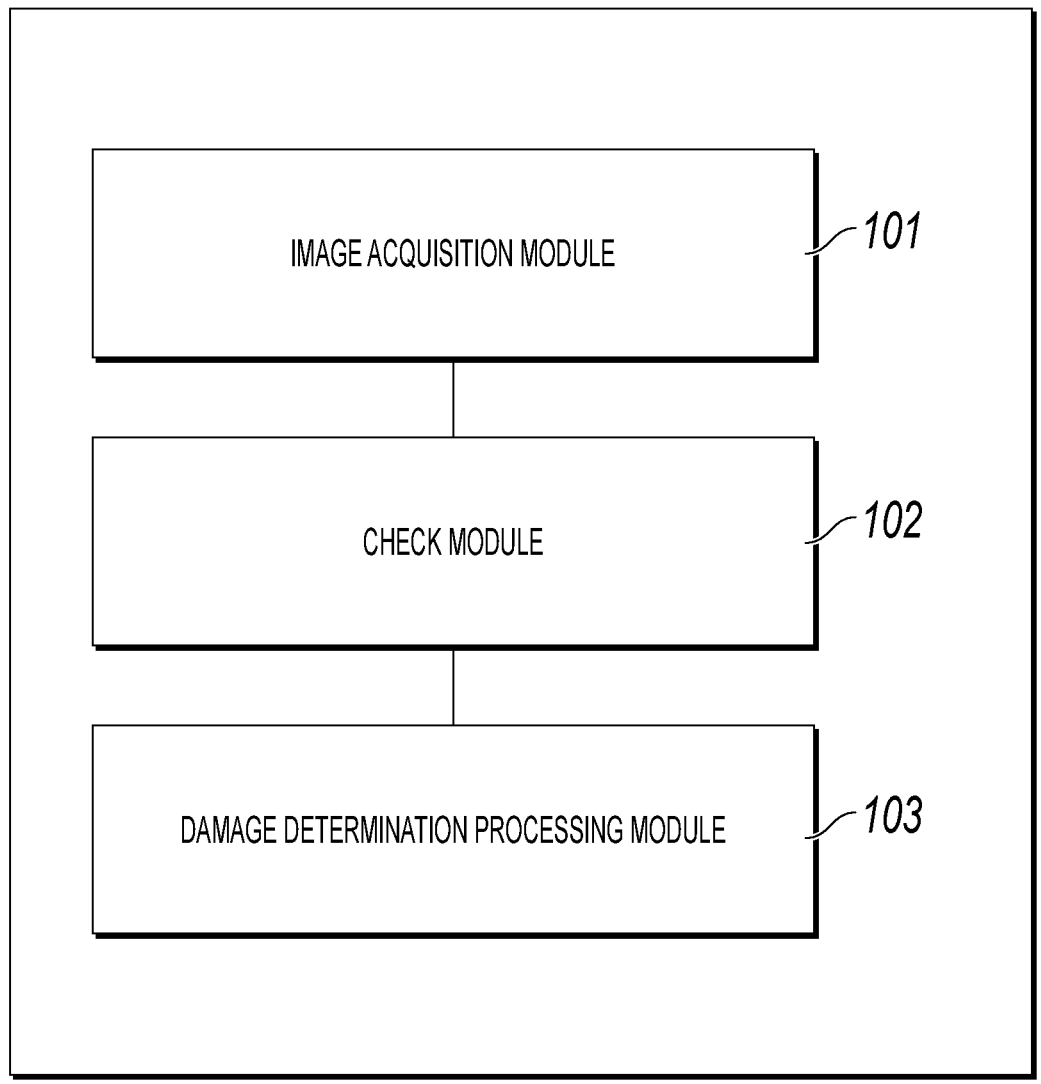
FIG. 4 is a schematic structural diagram of modules of an image-based vehicle damage determination apparatus according to an implementation of the present application.

Based on the previous image-based vehicle damage determination method, the present application further provides an image-based vehicle damage determination apparatus. The apparatus can include a system (including a distributed system), software (an application), a module, a component, a server, a client, etc. that use the method according to the present application. The apparatus can further include necessary implementation hardware. Based on a same inventive concept, the apparatus according to an implementation of the present application is described in the following descriptions. Implementation schemes of the apparatus for problem resolution are similar to that of the method. Therefore, for specific implementation of the apparatus in the present application, references can be made to the implementation of the method. Repetitive details are not separately described. The term "unit" or "module" described below can be implemented as a combination of software and/or hardware of a predetermined function. Although the apparatus described in the following implementation is preferably implemented by software, the apparatus may also be implemented by hardware or a combination of software and hardware. Specifically, FIG. 4 is a schematic diagram of modules of an image-based vehicle damage determination apparatus, according to an implementation of the present application. As shown in FIG. 4, the apparatus can include: an image acquisition module 101, configured to obtain an auto part image corresponding to an auto part; a check module 102, configured to: store a constructed component damage identification model, and check the auto part image by using the component damage identification model, to determine a damaged area and a damage type of the auto part; and a damage determination processing module 103, configured to generate a repair plan for the auto part based on information including the damaged area and the damage type of the auto part.

Referring to the method, the apparatus can be further implemented in another way. For example, the component damage identification model can be a deep neural network constructed after sample data training and based on network models of a convolutional layer and a region proposal layer. Alternatively, the apparatus can further include a repair strategy acquisition module, or directly use the damage determination processing module 103, to obtain information about a repair strategy of the auto part and generate a repair plan including an estimated repair price. For details, references can be made to related descriptions in the method implementations; hence are not described again here.

The method or apparatus in the present application can be implemented by using a computer program and necessary hardware, and can be configured in a device, so that an image-based vehicle damage determination result can be quickly and reliably output. Therefore, the present application can further provide an image-based vehicle damage determination apparatus that can be used on the server side, and can include a processor and a memory configured to store an instruction that can be executed by the processor. When executing the instruction, the processor implements the following operations: obtaining an auto part image corresponding to an auto part; checking the auto part image by using a constructed component damage identification model, to determine a damaged area and a damage type of the auto part; and generating a repair plan for the auto part based on information including the damaged area and the damage type of the auto part.

In specific actual processing, the apparatus can further include other processing hardware such as a GPU (Graphics Processing Unit). As described in the previous method, in another implementation of the apparatus, when executing the instruction, the processor can further implement the following operation: obtaining information about a repair strategy of the auto part.

Correspondingly, the repair plan can further include an estimated repair price corresponding to the repair strategy, and the estimated repair price is an estimated repair price of the auto part that is calculated based on the information including the damaged area, the damage type, and the repair strategy of the auto part and pricing information corresponding to a product and/or a repair service of the auto part in the repair strategy.

In another implementation of the apparatus, an instruction of the constructed component damage identification model can include an algorithm processing instruction of a deep neural network constructed after sample data training and based on network models of a convolutional layer and a region proposal layer.

In another implementation of the apparatus, when executing the instruction, if confirming that the currently processed auto part image includes at least two damaged areas, the processor executes the instruction of the component damage identification model to implement the following operations: identifying, based on the auto part image, the damaged areas of the auto part and damage types corresponding to the damaged areas; and selecting a damaged area corresponding to a damage type that is in the damage types and that indicates a highest damage degree as the damaged area of the auto part, where correspondingly, the damage type with the highest damage degree is the determined damage type of the auto part.

In another implementation of the apparatus, when the processor executes the instruction, if at least two auto part images of the auto part are obtained, the checking, by the processor, the auto part image by using a constructed component damage identification model, to determine a damaged area and a damage type of the auto part includes: separately checking the auto part images by using the component damage identification model, to determine a damaged area and a damage type of each auto part image; and performing, based on a predetermined rule, combined selection on the damaged areas and the damage types corresponding to the auto part images, to determine a result of the damaged area and the damage type of the auto part.

According to the image-based vehicle damage determination apparatus provided in this implementation of the present application, a training model identifying information such as a damaged area and a damage type more comprehensively and reliably can be constructed, and a damaged area and a damage type corresponding to the damaged area of an auto part can be detected by using the model, so as to obtain information required for accurate and comprehensive damage determination of the auto part. Further, in this implementation of the present application, a repair plan for the auto part is generated by using information including the identified damaged area and the damage type, so as to provide more accurate and reliable damage determination information with a practical reference value for an insurance staff and a vehicle owner. In another implementation of the present application, a repair plan and estimated repair costs can be automatically generated based on more specific vehicle damage information, an auto part price library, and a repair processing method, so as to satisfy a requirement of an insurance company or a vehicle owner for quick, comprehensive, accurate, and reliable vehicle damage determination processing, improve accuracy and reliability of a vehicle damage determination processing result, and improve user service experience.

The method or apparatus in the previous implementations of the present application can implement service logic by using a computer program and record the service logic in a storage medium, and the storage medium can be read and executed by a computer, so as to implement effects of the solutions described in the implementations of the present application. Therefore, the present application further provides a computer readable storage medium. The computer readable storage medium stores a computer instruction, and when the instruction is executed, the following steps are implemented: obtaining an auto part image corresponding to an auto part; checking the auto part image by using a constructed component damage identification model, to determine a damaged area and a damage type of the auto part; and generating a repair plan for the auto part based on information including the damaged area and the damage type of the auto part.

The computer readable storage medium can include a physical apparatus configured to store information. The apparatus usually stores the information in an electric, magnetic, optical, etc. way after the information is digitized. The computer readable storage medium in this implementation can include an apparatus for storing information in an electric way, for example, various memories such as a RAM and a ROM; an apparatus for storing information in a magnetic way, for example, a hard disk, a floppy disk, a magnetic tape, a core memory, a bubble memory, and a USB flash disk; and an apparatus for storing information in an optical way, for example, a CD or a DVD. Certainly, there are other readable storage media such as a quantum memory and a graphene memory.

Figure 5:
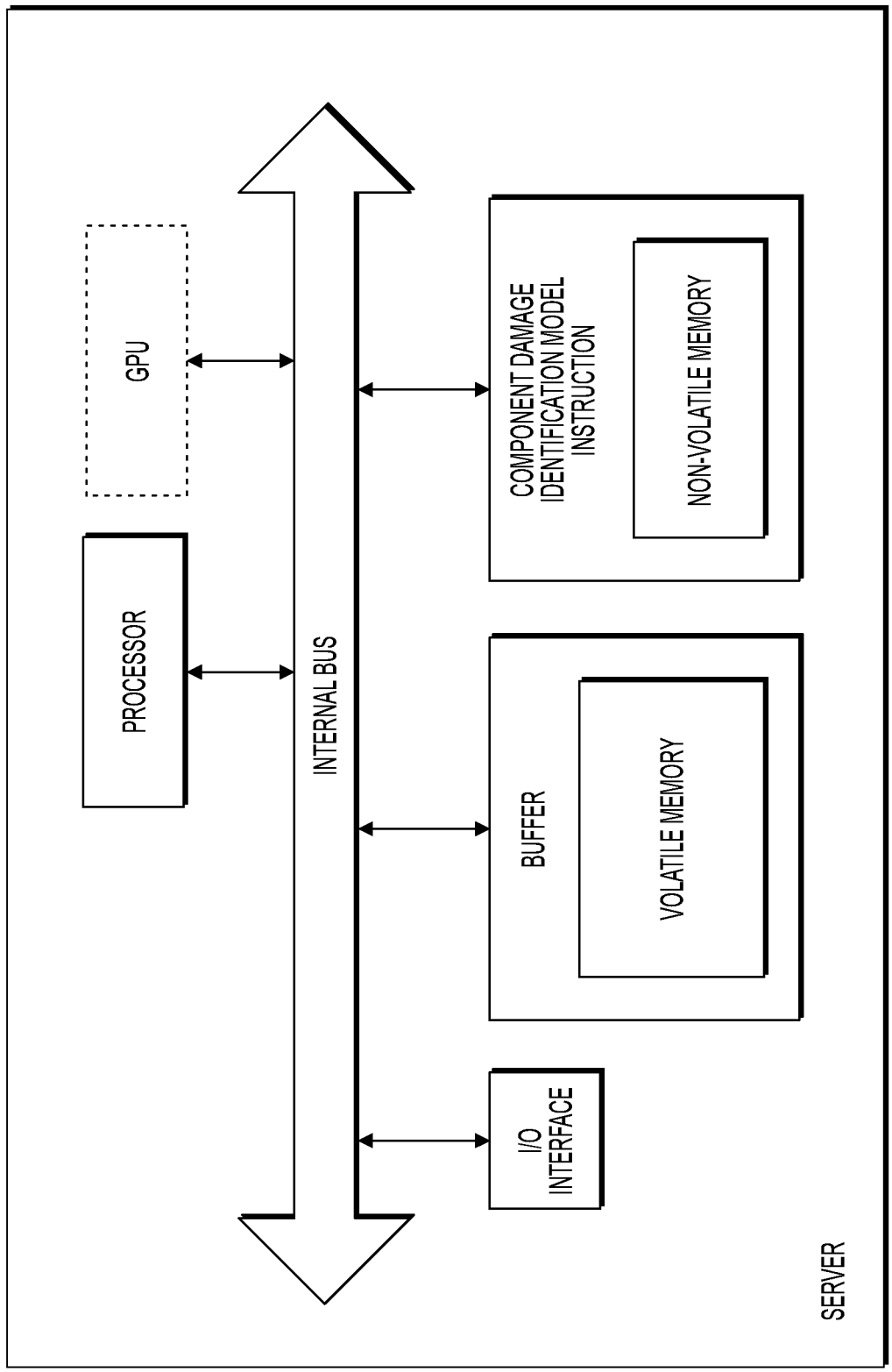
FIG. 5 is a schematic structural diagram of an electronic device according to an implementation of the present application.

The apparatus or method can be used in an electronic device for image processing, so as to implement quick image-based vehicle damage determination processing. The electronic device can be a separate server, or can be a system cluster including a plurality of application servers, or can be a server in a distributed system. FIG. 5 is a schematic structural diagram of an electronic device, according to an implementation of the present application. In an implementation, the electronic device can include a processor and a memory configured to store an instruction that can be executed by the processor. When executing the instruction, the processor implements the following operations: obtaining an auto part image corresponding to an auto part; checking the auto part image by using a constructed component damage identification model, to determine a damaged area and a damage type of the auto part; and generating a repair plan for the auto part based on information including the damaged area and the damage type of the auto part.

Figure 6:
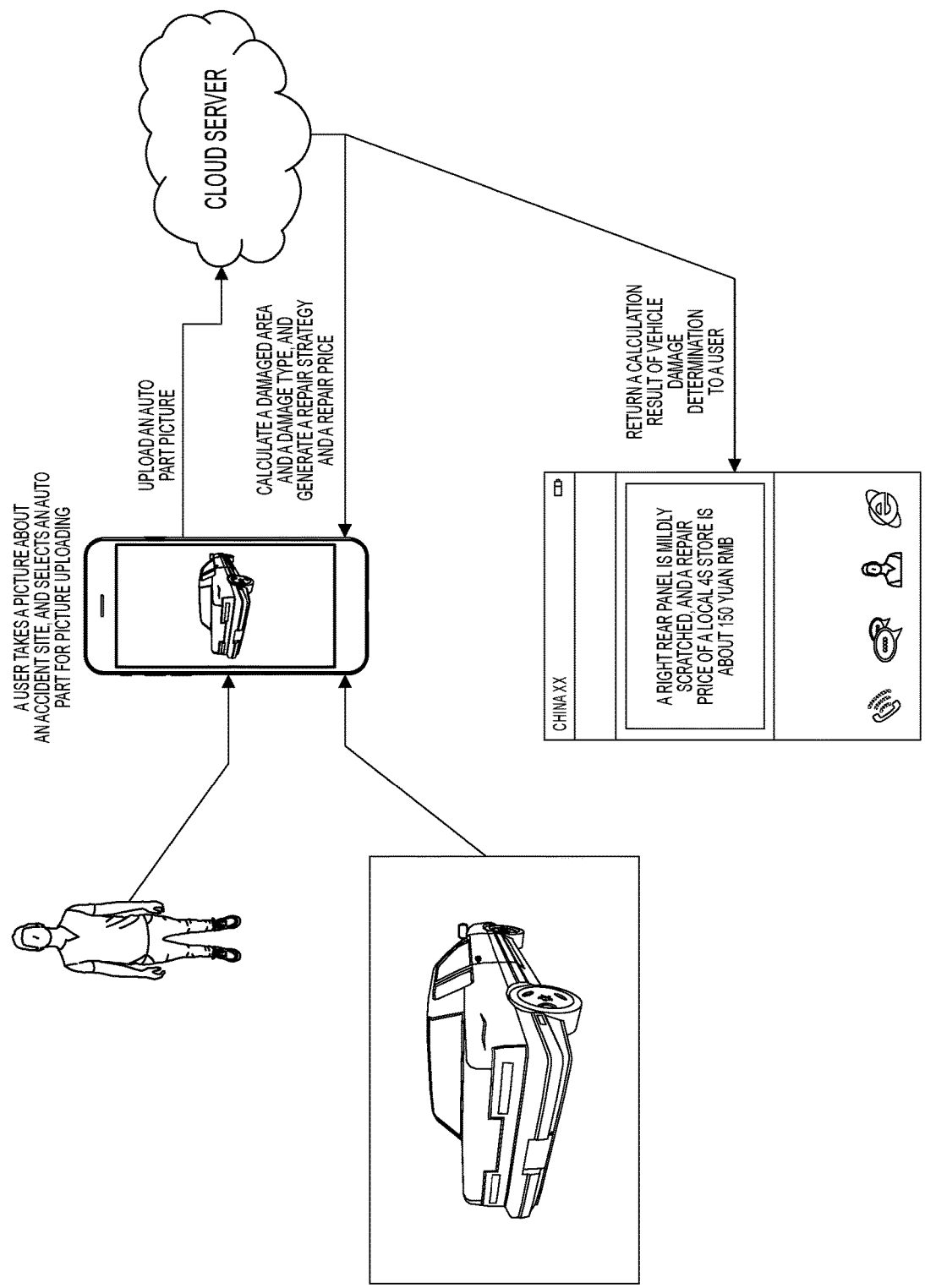
FIG. 6 is a schematic diagram of a processing scenario of vehicle damage determination according to an implementation of the present application.

FIG. 6 is a schematic diagram of a processing scenario of vehicle damage determination according to an implementation of the present application. A client in FIG. 6 is a mobile terminal of a user, and can be a PC or another terminal device in another implementation scenario. According to the image-based vehicle damage determination method and apparatus, and the electronic device provided in the present application, a damaged area and a damage type are detected by using a deep learning technology, the damaged area can be accurately located by using an image matching method, and damage determination accuracy can be improved by using a multi-image check result. An image check technology, an auto part price library, and a repair rule are combined to automatically generate a repair plan and price evaluation. In another implementation of the present application, a repair plan and estimated repair costs can be automatically generated based on more specific vehicle damage information, an auto part price library, and a repair processing method, so as to satisfy the requirement of an insurance company or a vehicle owner for quick, comprehensive, accurate, and reliable vehicle damage determination processing, improve accuracy and reliability of a vehicle damage determination, and improve user service experience.

It should be noted that, although the previous implementations describe some implementations of the apparatus, the electronic device, and the computer readable storage medium, they can be further implemented in other manners based on the related descriptions of the method or apparatus implementations. For details, refer to the related descriptions of the method or apparatus implementations. Details are not described here to avoid redundancy.

Although the present application includes descriptions of data model construction and data acquisition, exchange, calculation, and determination such as image quality processing, a convolution neural network, a region proposal network, and a deep neural network generated by using a combination of the convolution neural network and the region proposal network, a calculation method of an estimated repair price, and a processing method of a plurality of auto part images of a same component, the present application is not limited to complying with an industry communications standard, a standard data model, a computer processing and storage rule, or a case described in the implementations of the present application. Some industry standards or implementation solutions that are slightly modified in a self-defined way or based on implementations described in the implementations can also implement same, equivalent, similar, or deformed but expected implementation effects. Implementations obtained by using these modifications or transformed methods of data acquisition, storage, determination, and processing can still fall within the scope of the optional implementations of the present application.

In the 1990s, whether improvement in a technology is improvement in hardware (for example, improvement in a circuit structure such as a diode, a transistor, or a switch) or improvement in software (improvement in a method procedure) can be clearly determined. However, with technology development, improvement in many methods today can be considered as direct improvement in a hardware circuit structure. A designer often obtains a corresponding hardware circuit structure by programming an improved method into a hardware circuit. Therefore, it cannot be said that improvement in a method procedure cannot be implemented by using a hardware entity module. For example, a programmable logic device (PLD) (for example, a field programmable gate array (FPGA)) is such an integrated circuit, and a logical function is determined by a user based on component programming. The designer "integrates" a digital system into a PLD by programming, and does not need a chip manufacturer to design and manufacture a dedicated integrated circuit chip. In addition, an integrated circuit chip is not currently manually manufactured, and this programming is mostly implemented by using "logic compiler" software. It is similar to a software compiler used during program development and writing. Original code waiting to be compiled also needs to be written with a specific programming language. It is called a hardware description language (HDL). There is not only one HDL but a plurality of HDLs such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). VHDL (Very-High-Speed Integrated Circuit Hardware Description Language) and Verilog are most frequently used currently. A person skilled in the art should also understand that a method procedure only needs to be logically programmed by using the previous hardware description languages and programmed into an integrated circuit, to obtain a hardware circuit that implements the logical method procedure.

The controller can be implemented in any suitable way. For example, the controller can be implemented in a form of a microprocessor, a processor, a computer readable medium storing computer readable program code (for example, hardware or firmware) that can be executed by the processor (microprocessor), a logic gate, a switch, an application-specific integrated circuit (ASIC), a programmable logic controller, and an embedded microcontroller. The controller includes but is not limited to the following microcontrollers: ARC 625D, Atmel AT91SAM, Microchip PIC18F26K20, and Silicone Labs C8051F320. A memory controller can be implemented as a part of control logic of the memory. A person skilled in the art also knows that, in addition to implementing the controller by using computer readable program code only, the method steps can be logically programmed, so that the controller implements a same function in a form of a logic gate, a switch, an application-specific integrated circuit, a programmable logic controller, an embedded microcontroller, etc. Therefore, the controller can be considered as a hardware component, and an apparatus that is included in the controller and configured to implement various functions can also be considered as a structure in the hardware component. Alternatively, an apparatus configured to implement various functions can be considered as both a software module implementing the method and a structure in a hardware component.

The system, apparatus, module, or unit described in the previous implementations can be specifically implemented by a computer chip or an entity, or implemented by a product having a specific function. A typical implementation device is a computer. Specifically, the computer can be a personal computer, a laptop computer, an in-vehicle human-computer interaction device, a cellular phone, a camera phone, a smartphone, a personal digital assistant, a media player, a navigation device, an e-mail device, a game console, a tablet computer, a wearable device, or a combination of any of these devices.

Although the present application provides the method operation steps described in the implementations or flowcharts, more or fewer operation steps can be included based on a conventional or non-creative method. The step sequence listed in the implementations is merely one of a plurality of step execution sequences, and does not represent a unique execution sequence. In actual apparatus or terminal product execution, the steps can be performed sequentially or in parallel based on the method shown in the implementations or the accompanying drawings (for example, a parallel processor or a multi-threaded processing environment, or even a distributed data processing environment). The term "include", "contain", or any other variants means to cover the non-exclusive inclusion, so that a process, method, product, or device that includes a series of elements not only includes those elements, but also includes other elements not expressly listed, or further includes elements inherent to the process, method, product, or device. When there are no more limitations, other same or equivalent elements can be further included in the process, method, product, or device that includes the elements.

For ease of description, the apparatus is described by dividing the apparatus into various modules in terms of functions. Certainly, during implementation of the present application, the functions of the modules can be implemented in one or more pieces of software and/or hardware, or a plurality of submodules or subunits implementing a same function can be jointly implemented. The described apparatus implementation is merely an example. For example, the unit division is merely logical function division and can be other division in actual implementation. For example, a plurality of units or components can be combined or integrated into another system, or some features can be ignored or not performed. In addition, the displayed or discussed mutual couplings or direct couplings or communication connections can be implemented by using some interfaces. The indirect couplings or communication connections between the apparatus or units can be implemented in electronic, mechanical, or other forms.

A person skilled in the art also knows that, in addition to implementing the controller by using computer readable program code only, the method steps can be logically programmed, so that the controller implements a same function in a form of a logic gate, a switch, an application-specific integrated circuit, a programmable logic controller, an embedded microcontroller, etc. Therefore, the controller can be considered as a hardware component, and an apparatus that is included in the controller and configured to implement various functions can also be considered as a structure in the hardware component. Alternatively, an apparatus configured to implement various functions can be considered as both a software module implementing the method and a structure in a hardware component.

The present disclosure is described with reference to the flowcharts and/or block diagrams of the method, the device (system), and the computer program product according to the implementations of the present disclosure. It should be understood that computer program instructions can be used to implement each process and/or block in the flowcharts and/or the block diagrams and a combination of processes and/or blocks in the flowcharts and/or the block diagrams. These computer program instructions can be provided for a general-purpose computer, a dedicated computer, an embedded processor, or a processor of any other programmable data processing device to generate a machine, so that the instructions executed by the computer or the processor of any other programmable data processing device generate an apparatus for implementing a specific function in one or more processes in the flowcharts and/or in one or more blocks in the block diagrams.

These computer program instructions can be stored in a computer readable memory that can instruct the computer or any other programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, the computing device includes one or more central processing units (CPU), an input/output interface, a network interface, and a memory.

The memory can include a non-persistent memory, a random access memory (RAM), and/or a non-volatile memory such as a read-only memory (ROM) or a flash memory (flash RAM) in a computer readable medium. The memory is an example of the computer readable medium.

The computer readable medium includes a persistent medium and a non-persistent medium, or a movable medium and an unmovable medium that can store information by using any method or technology. The information can be a computer readable instruction, a data structure, a program module, or other data. The computer storage medium includes but is not limited to a phase change memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or other optical storage, a cassette magnetic tape, a tape or disk storage device or another magnetic storage device or any other non-transmission medium that can be configured to store information that can be accessed by a computing device. As defined in this specification, the computer readable medium does not include transitory media, for example, a modulated data signal and carrier.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, and the like) that include computer-usable program code.

The present application can be described in a general context of a computer executable instruction executed by a computer, for example, a program module. Generally, the program module includes a routine, a program, an object, a component, a data structure, etc. for executing a specific task or implementing a specific abstract data type. The present application can also be practiced in a distributed computing environment that tasks are performed by remote processing devices that are connected by using a communications network. In the distributed computing environment, the program module can be in both local and remote computer storage media including storage devices.

The implementations in this specification are all described in a progressive manner, for same or similar parts in the implementations, reference can be made to these implementations, and each implementation focuses on a difference from other implementations. Especially, a system implementation is basically similar to a method implementation, and therefore is described briefly. For related parts, refer to partial descriptions in the method implementation. In descriptions in this specification, descriptions about such reference terms as "an implementation", "some implementations", "an example", "a specific example", and "some examples" mean that specific features, structures, materials, or characteristics described with reference to the implementations or examples are included in at least one implementation or example of the present application. In this specification, example expressions of the terms are not necessarily for a same implementation or example. In addition, the described specific features, structures, materials, or characteristics can be combined in a proper way in any one or more of the implementations or examples. Moreover, a person skilled in the art can integrate or combine different implementations or examples and characteristics of different implementations or examples described in this specification, provided that they do not conflict with each other.

The previous descriptions are merely implementations of the present application, and are not intended to limit the present application. For a person skilled in the art, the present application can have various modifications and changes. Any modification, equivalent replacement, or improvement made without departing from the spirit and principle of the present application shall fall within the scope of the claims of the present application.

Figure 7:
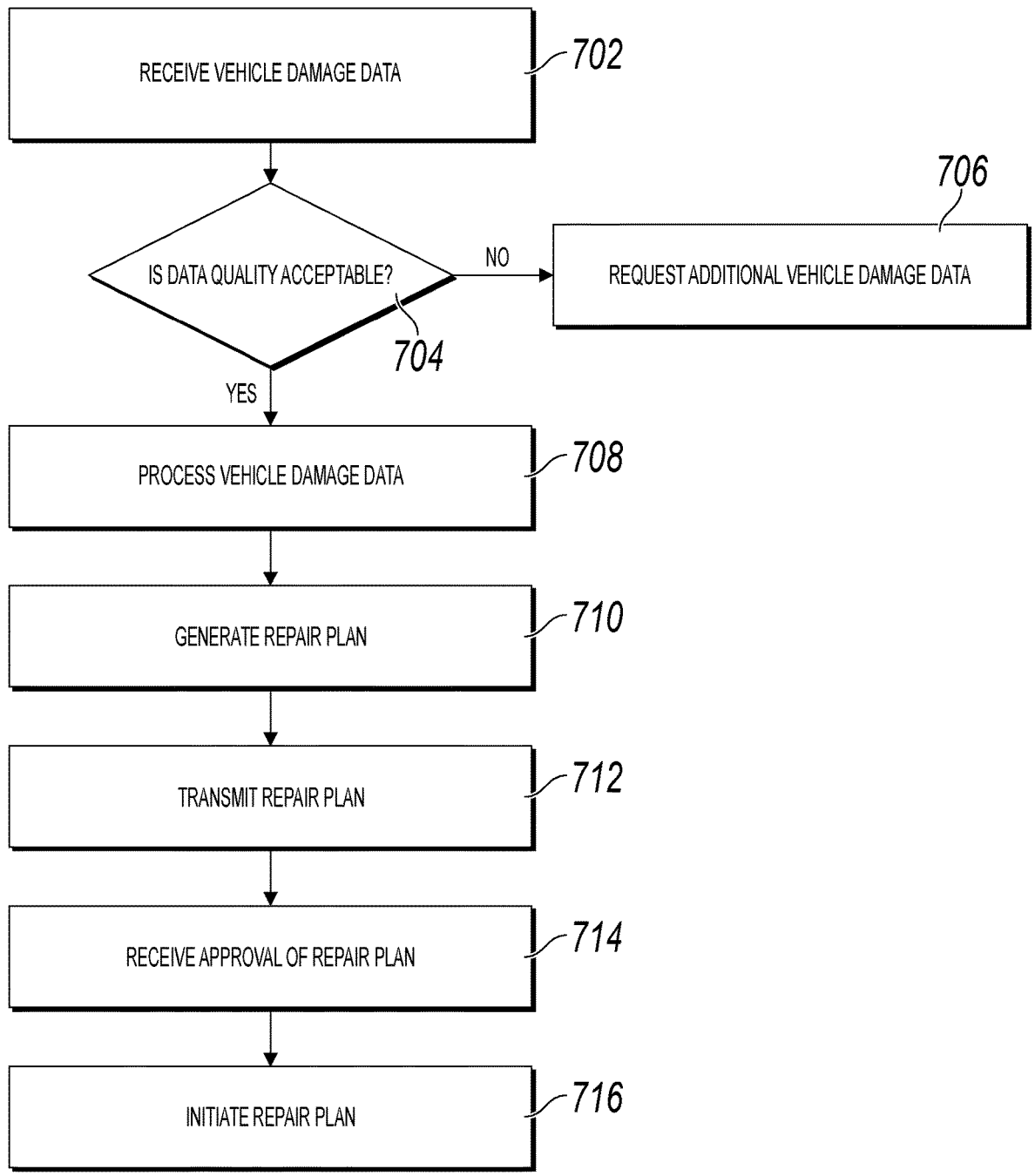
FIG. 7 is a flowchart illustrating an example of a computer-implemented method for planning vehicle repair, according to an implementation of the present disclosure.

FIG. 7 is a flowchart illustrating an example of a computer-implemented method 700 for generating vehicle repair plan, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, vehicle damage data is received. The vehicle can include any type of private or public vehicle, such as a car, a truck, a boat, a train, a helicopter, and/or an airplane. In some implementations, the vehicle damage data is received from a user, such as a vehicle operator or a vehicle owner. The vehicle operator can take one or more pictures (or images) of the damaged location of the vehicle by using a mobile device (such as a mobile phone) at an accident scene involving the damaged vehicle. The vehicle operator can directly upload the pictures or transmit the pictures to the vehicle owner to upload them. For example, the user can access an application configured to support vehicle repair to upload the acquired pictures. The application can be configured to automatically process the images to minimize the amount of transmitted data to minimize bandwidth requirements. The image processing can include filtering the images to delete features (e.g., background features) that are irrelevant for damage identification. The image processing can include conversion to gray scale images to minimize transmission bandwidth requirements. The image processing can include compression to a predetermined file size to minimize transmission bandwidth requirements. In addition to the pictures, the user can provide a user identifier (e.g., name and a password) and data associated to the uploaded pictures. The data can include indication of the damaged auto part (e.g., a front bumper, a left front door, or a taillight of the vehicle), the vehicle owner, insurance information, insurance information of other parties associated to the damaged vehicle, accident conditions, location and time of accident. From 702, method 700 proceeds to 704.

At 704, vehicle damage data is processed to determine whether the data quality is acceptable and sufficient. If the vehicle damage data is below a quality threshold or portions of the vehicle damage data are missing, from 704, method 700 proceeds to 706.

At 706, additional vehicle damage data are requested from the user. For example, the user can be instructed to provide additional pictures that conform to particular standards that enable image processing. In some implementations, the user can be instructed to provide additional data associated to the uploaded pictures. From 706, method 700 returns to 702.

If the vehicle damage data is above the quality threshold, from 704, method 700 proceeds to 708. At 708, the received vehicle damage data is processed to retrieve user information based on the user identifier and to identify one or more damaged area locations respective one or more damage types of the auto parts based on a particular model. The model can be configured to perform one or more image processing techniques to parse the vehicle image by using the pre-constructed vehicle part damage identification model to identify the damaged area and the damage type of the vehicle part in the image. The damaged area includes a part that is damaged on the vehicle. A damaged vehicle part may include a plurality of damaged areas, and each damaged area corresponds to a damage type (for example, severe scratching or mild deformation). In some implementations, a location region of a damaged area in an image to be processed can be parsed to identify a damage type. The damage type can include mild scratching, severe scratching, mild deformation, moderate deformation, severe deformation, damage, and disassembling-required check. In some implementations, the damage type can be quantified using scores (e.g., 1, 2, 3) to differentiate between mild, moderate and severe damages. The vehicle part damage identification model can include a machine-learning algorithm, a convolutional neural network (CNN), and a region proposal network (RPN), as described with reference to FIGS. 1-3. In some implementations, damage identification can include generation of damage ranking based on severity of damage. For example, if the vehicle includes multiple damaged areas, the overall damage of the vehicle can be ranked using the damage scores of the damaged areas. From 708, method 700 proceeds to 710.

At 710, a repair plan is generated based on the identified damaged area locations and damage types. The repair plan can be generated using a rule engine. The rule engine can invoke different pricing scheme databases based on a repair strategy associated to the vehicle model, location, and available repair shops, to generate, based on a set of rules, at least one repair plan for the damaged vehicle part including the repair services that can remedy the identified damage. The rules can include front-end rules and back-end rules. The front-end rules can indicate contract requirements, such as a minimum type of information type necessary to determine a repair plan. These contract-based features may include labor rates, chargeable hours per particular task, or any other aspect of the work covered by the repair plan. The back-end rules can indicate whether the repair plan aligns with the identified damage (e.g., in the case of a front-end collision, the system would flag a rear tail light assembly indicated as needing repair). The repair plan can include cost estimates and time estimates corresponding to possible repair services and locations. In some implementations, generating the repair plan includes transmitting assignment data one or more vehicle repair shops as part of the first notice of loss (FNOL) process to generate assignment estimates. Assignment data may include, but not be limited to, damage information, customer name, contact information, insurance claim number, assignment date, loss date, loss type, loss type detail, loss description, current vehicle location, location where vehicle may be sent, deductible amount, vehicle type, year/make/model, vehicle identification number (VIN), license plate number, towing company information, damage information, prior damage information, and vehicle safety status (drivable/non-drivable). From 710, method 700 proceeds to 712.

At 712, the repair plan is transmitted to the user and/or an insurer associated to the vehicle. The repair plan transmission can include generating a repair plan code interpretable by the application configured to support the vehicle repair.

The plan code can be formatted to minimize the amount of transmitted data to minimize bandwidth requirements and to increase the speed of the visualization process. The application can be configured to generate an alert for the user to indicate that the repair plan is ready to be reviewed. The application can be configured to display the repair plan for the user of the mobile device on a graphical user interface of the application. From 712, method 700 proceeds to 714.

At 714, an approval of the repair plan can be received from the user and/or the insurer. The approval of the repair plan can indicate if the financial responsibility is accepted by the user, the insurer, and/or a third party. The approval of the repair plan can include a selection of a repair shop and at least a portion of the possible repair services listed in the proposed repair plan. The approval of the repair plan can include a preferred timing to initiate the repair plan. From 714, method 700 proceeds to 716.

At 716, in response to receiving the approval of the repair plan, the repair plan is initiated. Initiating the repair plan can include transmitting work assignment data a selected vehicle repair shop to conduct repair operations. An advantage of communication with the vehicle repair shop is the ability to offer real-time updates when any of the information changes during the course of the claim and/or repair and may expedite the repair for the customer. After 716, method 700 stops.

The implementations of the present disclosure can improve corresponding data sharing efficiency, while reducing computing resources by minimizing the amount of transmitted data to minimize bandwidth requirements and to increase the speed of vehicle repair plan generation process.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for generation of a vehicle repair plan, the method being executed by one or more processors and comprising:
    receiving, by the one or more processors, vehicle damage data comprising at least an image of a damaged vehicle that has a plurality of damaged parts;
    determining (i) a particular damaged part of the damaged vehicle, and (ii) a damage type of the particular damaged part of the damaged vehicle, comprising:
        inputting, by the one or more processors, the image of the damaged vehicle into a neural network model that is trained based on a machine-learning algorithm; and
        obtaining, by the one or more processors, data identifying (i) the plurality of damaged parts that the neural network model indicates are each damaged, and, (ii) for each of the plurality of damaged parts, a damage type associated with the damaged part;
    determining that the damage type of the particular damaged part reflects a highest degree of damage among the respective damage types of the plurality of damaged parts that the neural network indicates are each damaged, and, in response, selecting, from among the plurality of damaged parts that the neural network indicates are each damaged, the particular damaged part of the damaged vehicle for generation of a repair plan;
    generating, by the one or more processors, the repair plan for the damaged vehicle based on the particular damaged part, and the damage type associated with a particular region of the image; and
    initiating, by the one or more processors, the repair plan for the damaged vehicle.

2. The computer-implemented method of claim 1, wherein the repair plan comprises an estimated repair corresponding to the particular damaged part and the damage type.

3. The computer-implemented method of claim 1, wherein the machine-learning algorithm comprises one or more of a convolutional neural network or a region proposal network.

4. The computer-implemented method of claim 1, further comprising ranking the plurality of damaged parts based on a severity of respective damage type.

5. The computer-implemented method of claim 1, wherein the image is processed to delete features that are irrelevant for damage identification.

6. The computer-implemented method of claim 1, wherein the plurality of damaged parts and the damage type associated with each damaged part are determined based on an analysis of multiple images of the damaged vehicle that were taken from different perspectives.

7. The method of claim 1, wherein the repair plan is generated for the particular damaged part only, without generating a repair plan for other of the plurality of damaged parts that the neural network model indicates are each damaged.

8. A non-transitory computer-readable storage media coupled to one or more processors and having instructions stored thereon which, when executed by the one or more processors, cause the one or more processors to perform operations for generation of a vehicle repair plan, the operations comprising:
    receiving, by the one or more processors, vehicle damage data comprising at least an image of a damaged vehicle that has a plurality of damaged parts;
    determining (i) a particular damaged part of the damaged vehicle, and (ii) a damage type of the particular damaged part of the damaged vehicle, comprising:
        inputting, by the one or more processors, the image of the damaged vehicle into a neural network model that is trained based on a machine-learning algorithm; and
        obtaining, by the one or more processors, data identifying (i) the plurality of damaged parts that the neural network model indicates are each damaged, and, (ii) for each of the plurality of damaged parts, a damage type associated with the damaged part;
    determining that the damage type of the particular damaged part reflects a highest degree of damage among the respective damage types of the plurality of damaged parts that the neural network indicates are each damaged, and, in response, selecting, from among the plurality of damaged parts that the neural network indicates are each damaged, the particular damaged part of the damaged vehicle for generation of a repair plan;

generating, by the one or more processors, the repair plan for the damaged vehicle based on the particular damaged part, and the damage type associated with a particular region of the image; and initiating, by the one or more processors, the repair plan for the damaged vehicle.

9. The non-transitory, computer-readable medium of claim 8, wherein the repair plan comprises an estimated repair corresponding to the particular damaged part and the damage type.

10. The non-transitory, computer-readable medium of claim 8, wherein the machine-learning algorithm comprises one or more of a convolutional neural network, or a region proposal network.

11. The non-transitory, computer-readable medium of claim 8, further comprising ranking the plurality of damaged parts based on a severity of respective damage type.

12. The non-transitory, computer-readable medium of claim 8, wherein the image is processed to delete features that are irrelevant for damage identification.

13. The non-transitory, computer-readable medium of claim 8, wherein the plurality of damaged parts and the damage type associated with each damaged part are determined based on an analysis of multiple images of the damaged vehicle that were taken from different perspectives.

14. A system, comprising:
one or more processors; and
a computer-readable storage device coupled to the one or more processors and having instructions stored thereon which, when executed by the one or more processors, cause the one or more processors to perform operations for generation of a vehicle repair plan, the operations comprising:

receiving, by the one or more processors, vehicle damage data comprising at least an image of a damaged vehicle that has a plurality of damaged parts;

determining (i) a particular damaged part of the damaged vehicle, and (ii) a damage type of the particular damaged part of the damaged vehicle, comprising:

inputting, by the one or more processors, the image of the damaged vehicle into a neural network model that is trained based on a machine-learning algorithm; and obtaining, by the one or more processors, data identifying (i) the plurality of damaged parts that the neural network model indicates are each damaged, and, (ii) for each of the plurality of damaged parts, a damage type associated with the damaged part;

determining that the damage type of the particular damaged part reflects a highest degree of damage among the respective damage types of the plurality of damaged parts that the neural network indicates are each damaged, and, in response, selecting, from among the plurality of damaged parts that the neural network indicates are each damaged, the particular damaged part of the damaged vehicle for generation of a repair plan;

generating, by the one or more processors, the repair plan for the damaged vehicle based on the particular damaged part, and the damage type associated with a particular region of the image; and initiating, by the one or more processors, the repair plan for the damaged vehicle.

15. The system of claim 14, wherein the repair plan comprises an estimated repair corresponding to the particular damaged part and the damage type.

16. The system of claim 14, wherein the machine-learning algorithm comprises one or more of a convolutional neural network, or a region proposal network.

* * * * *